(Model.)
W. WILSON, Jr.
Machine for Making Screw Threaded Stoppers.
No. 237,224. Patented Feb. 1, 1881.
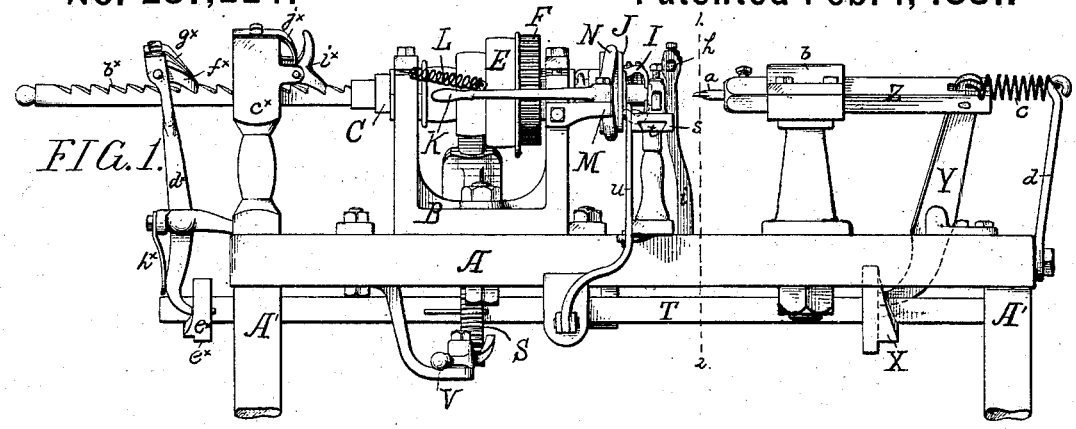
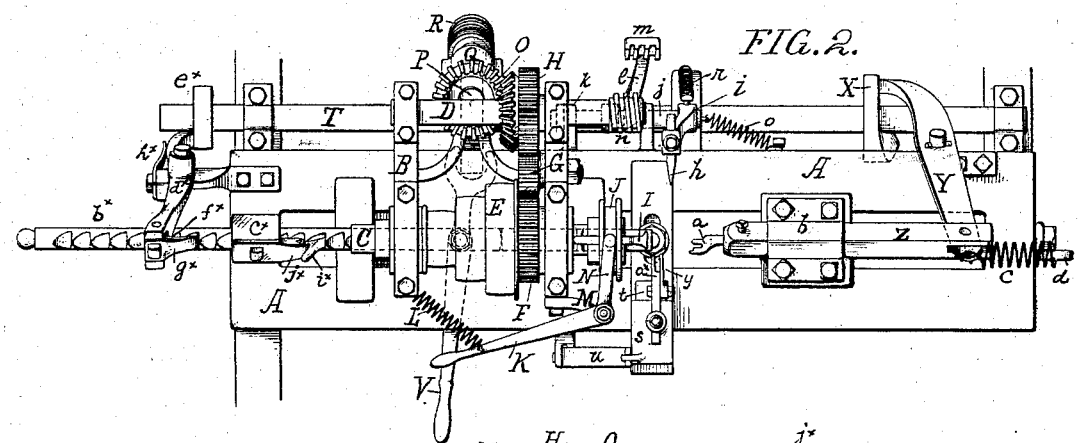
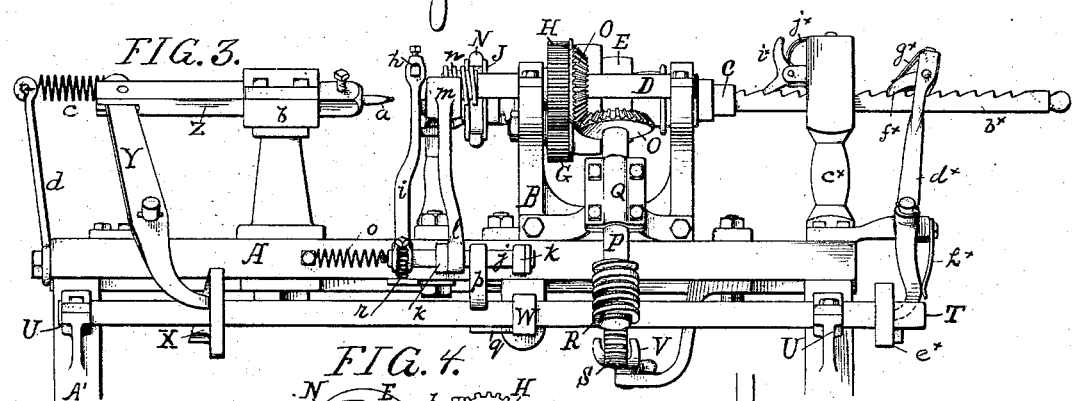
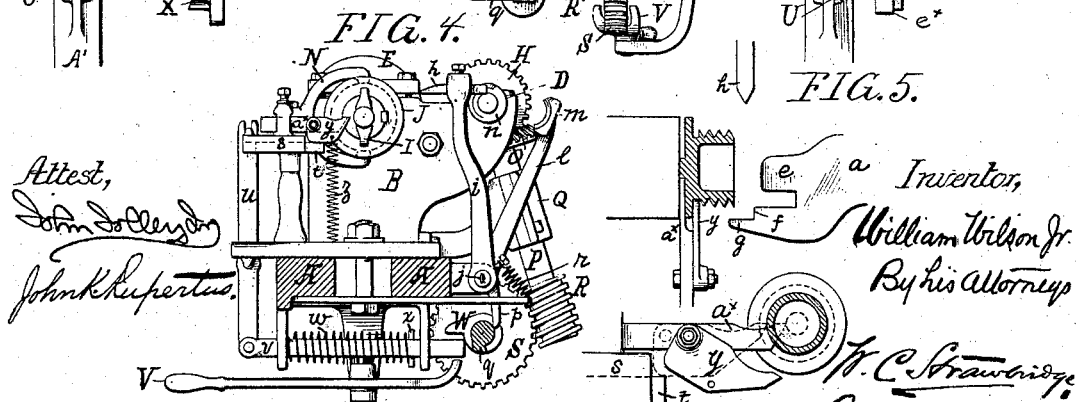
Attest,
Inventor,
William Wilson Jr.
By his Attorneys
N. PETERS, PHOTO-LITHOGRAPHER, WASHINGTON, D. C.

UNITED STATES PATENT OFFICE.

WILLIAM WILSON, JR., OF GREENVILLE, DELAWARE, ASSIGNOR OF ONE-HALF TO CHARLES GREEN, OF SAME PLACE.

MACHINE FOR MAKING SCREW-THREADED STOPPERS.

SPECIFICATION forming part of Letters Patent No. 237,224, dated February 1, 1881.

Application filed July 6, 1880. (Model.)

*To all whom it may concern:*

Be it known that I, WILLIAM WILSON, Jr., of Greenville, Delaware, have invented an Improved Automatic Machine for Shaping and Threading Screw Stoppers or Plugs for the Nozzles of Cans, of which the following is a specification.

My invention relates to the class of machinery which is employed to manufacture, from continuous cylinders of suitable material, such screw-threaded plugs or stoppers as are employed to screw into the bungs, discharging-orifices, spouts, or nozzles of vessels of various kinds, but especially of metallic powder-kegs, and of the various classes of sheet-metal cans employed for the containing of various substances, such as preserved edibles, paints, powder, and the like.

The object of my invention is the construction of such a machine as shall operate automatically to manufacture from a solid cylindrical blank, in continuous series but one at a time, the screw-threaded plugs hereinafter referred to; as shall form each plug to such shape as renders it practically complete and ready for use, although it may, if desired, be subjected to subsequent refinishing processes; as will not only shape out the head and extension of the plug, but will thread the extension, cut the plug off, and discharge it in condition for use.

To the above ends my invention consists in the machine hereinafter described as an embodiment thereof.

In the accompanying drawings, Figure 1 is a front elevation of a machine conveniently embodying my invention; Fig. 2, a top-plan view of the same; Fig. 3, a rear elevation; Fig. 4, a transverse sectional elevation on the line 1 2 of Fig. 1, looking from the right to the left of said Fig. 1; Fig. 5, an enlarged top-plan detail of the shaping drill-bit and clearing and cutting-off bits, the nozzle being shown in section as it appears when finished by the machine; Fig. 6, a side elevation of the clearing-bit, which clears the inner under surface of the head of the plug, and of the cutting-off bit, which severs the finished plug from the cylindrical or other shaped blank out of which it is fashioned.

Similar letters of reference indicate corresponding parts wherever used.

In the accompanying drawings, A A' is the frame-work of the machine, consisting of two shears, A, similar to those of a lathe, and of legs A'.

B is a head, formed substantially into the shape indicated in the various figures of the drawings, and adapted to sustain two shafts, C and D.

C is the driving-shaft, suitably journaled in the head, and made hollow throughout. Upon it are mounted the graduated pulleys E, by means of power applied to which is imparted to said shaft the requisite rotation. Upon it is also mounted a driving toothed wheel, F, whose office is to impart motion to an idler toothed wheel, G, which, in turn, drives a driven toothed wheel, H, mounted upon the driven shaft D. By the above devices the driven shaft is rotated at the proper speed.

The driving-shaft C is, as stated, hollow, and at the commencement of the action of making the plug a cylindrical blank of such material as it is desired to form the plug of is placed within the hollow shaft, the blank being of a length sufficient to project to the front of the shaft to some extent.

Two jaws, I I, form a clutch to the plug-blank, and are disposed upon either side of the shaft and embraced by a sliding collar, J, which, according to the direction in which it is slid, clamps the jaws together upon the blank, or else permits expanding springs or the like well-known devices, adjusted beneath the jaws and against the exterior of the shaft, to throw the jaws apart. When the collar is slid so as to approach the biting extremities of the jaws, it clamps them together upon the blank and causes them to rotate the blank with the driving-shaft, to which the inner extremities of the jaws are fixed.

The handle K, controlled by a spiral spring, L, or the like, is pivoted at M to a projection from the head, and is provided with a collar-lever, N, which, lying in a groove of the collar, enables the sliding of the collar in one direction or the other, according to the motion of the clutch-handle K. At rest, the position of the clutch, by reason of the spiral L, is that shown in Figs. 1 and 2—i. e., in bite with the blank.

By the above statement it will be understood that when the blank is supplied to the driving-shaft and the clutch is in action upon it, the blank is continuously rotated and is in condition to be acted upon by the shaping-bits, whereof hereinafter.

Referring, now, to the back view, Fig. 3, O is a beveled gear, one wheel of which is upon the driven shaft D, and the other upon a worm-shaft, P, journaled in a bearing, Q, suitably supported from the head. The lower extremity of the worm-shaft P carries a worm, R, adapted to gear into a worm-wheel, S, (well shown in Fig. 4,) feathered upon a cam-shaft, T, parallel with the shears, well placed slightly below them, and supported in bearings U upon the back legs of the frame. The worm-wheel S is, as stated, feathered upon the cam-shaft, and is brought into or out of action with the worm by means of a worm-wheel lever, V, pivoted to the under part of the frame-work.

It will be understood that when the worm-wheel is thrown by this lever into contact with the worm, the machine being in action, the cam-shaft will be rotated by the worm through the medium of the worm-shaft and bevel-gearing from the driven shaft. The diameters of the bevels, several toothed wheels, and worm referred to are such as to establish the proper relation of speed between the driving-shaft, the driven shaft, and the cam-shaft.

The cam-shaft is provided with a series of cams, the office of which, as hereinafter more fully stated, is to throw into action the shaping-bit, threading-bit, clearing and cutting-off bits, and blank-feed.

Suppose the blank to be advanced to the front of the clutch-jaws a sufficient distance to form a plug of the proper depth, and suppose the machine in action and the cam-shaft rotating:

X is a cam of substantially the form shown in Figs. 1, 2, and 3, against the side of which bears the actuating-lever Y of the shaping-bit, which is pivoted upon the shears, and at its upper extremity is engaged with a slide, Z, which carries the shaping-bit $a$. The slide reciprocates in a bearing, $b$, and is controlled by the lever Y and by a spiral spring, $c$, secured to an upright, $d$, erected from the shears.

It is obvious that the rotation of the cam-shaft, the action of the cam X and lever Y, and the counter influence of the spiral spring $c$ will cause the intermittent reciprocation of the slide Z and of the shaping-bit. The cam X is properly formed and set to time the stroke of the shaping-bit.

Referring, now, to Fig. 5, which is an enlarged plan detail of the shaping-bit $a$—suppose the latter to be advanced against the rotating blank, the part $e$ will core out the center of the blank, the part $f$ will cut down the exterior surface of the blank to a diameter which is the extreme width of the threads (subsequently cut) of the projection of the plug, while the part $g$ will edge off the circumferential edge of the head of the plug. So much of the plug having been shaped during the period when the cam X held the shaping-bit against the blank, the further rotation of said cam enables the spring $c$ to recoil the shaping-bit, and the above-described portion of the action is ended.

$h$ is a threading-bit sustained upon the upper extremity of a rock-shaft arm, $i$, (well shown in Figs. 3 and 4,) which is in range, when thrown forward, with the previously-shaped projection of the plug or the portion which is to receive the screw-thread.

$j$ is a rock-shaft supporting the arm $i$, and journaled at $k$ to the rear of the back shears.

$l$ is a thread-plate arm, also erected from and rocking with the rock-shaft $j$, the upper end of which is provided with a thread-plate, $m$, of proper form to mesh with a threaded butt, $n$, upon the outer extremity of the driven shaft. The rock-shaft $j$ is adapted to slide horizontally in its bearings, under the control of a spiral spring, $o$, so that when the thread-plate $m$ is brought into contact, as hereinafter set forth, with the revolving threaded butt, the rock-shaft is drawn along to the right hand of Fig. 3 by the action of the butt upon the plate, and thereby the path of a spiral is imparted to the threading-bit $h$.

$p$ is a cam-toe affixed to the rock-shaft $j$, and adapted to be acted upon by a toe-cam, $q$, upon the cam-shaft, whereby the thread-plate arm $l$ and rock-shaft $i$ are thrown in, respectively, against the threaded butt and the projection of the plug.

$r$ is a spiral spring attached to the bit rock-shaft arm, the action of which is to draw the rock-shaft arm, rock-shaft, and thread-plate arm back again and out of action after the toe-cam $q$ has ceased acting upon the toe $p$.

By the above arrangement, which is brought into action by the toe-cam after the action of the shaping-bit, the threads are cut upon the previously-shaped projection of the plug, the threading-bit acting to thread the entire projection, and being stopped only by the inner face of the head of the plug, which it encounters after it has cut the thread up to the head. All lateral motion of the rock-shaft in the direction of the cutting of the screw-threads is due to the action of the thread-plate against the threaded butt of the driven shaft.

The above is the second portion of the action of my machine, and it is altogether brought about by the rotation of the cam-shaft in the manner stated.

The next action upon the plug is that of clearing out the inner or under surface of the head of the plug and cutting off the formed plug from the blank from which it is formed, and this is accomplished by a clearing and a cutting-off bit, the construction of which is the following:

$s$ is a sliding head, Figs. 1, 2, and 4, which carries in suitable mountings the clearing and cutting-off bits. It slides upon a horizontal bearing, $t$, set transversely to the axis of the shears, and it is thrown transversely in and out against the rotating blank by means of a lever, $u$, pivoted to the frame and connected at its lower end with a sliding bar, $v$, hung in bearings below the shears and in line to encounter a cam, W, upon the cam-shaft. As the cam-shaft revolves, the sliding bar $v$ is struck by the cam W and thrown to the left in Fig. 4, whereby the lever $u$ is thrown in at its upper extremity, and with it the sliding head is thrown in against the rotating blank.

$w$ is a spiral spring coiled about the sliding bar $v$, and acting against a pin, $x$, upon it in such manner as to throw back the sliding bar and lever $u$ and retract the sliding head $s$ after the action of its bits is completed.

$y$ is a clearing-bit carried by the head, (well shown in Figs. 4 and 6.) It is pivoted to the cutting-off bit in such manner that as the sliding head is thrown in against the blank the under surface of said clearing-bit $y$ bears upon the front face of the horizontal bearing $t$ until such time as the sliding head has been sufficiently advanced to cause a spiral spring, $z$, to draw down the bit $y$ about its pivot away from the supporting-face of the bearing $t$, and into the position shown in full lines in Fig. 6. When this action has taken place the clearing-bit has cleared out the inner face of the plug, as shown in Fig. 5. The bit $y$ is drawn down and away from the plug before the completion of the forward throw of the sliding head, and the further throw of said head causes the cutting-off bit $a^x$ to cut off the completed plug from the blank from which it is made, after which cutting off, upon the further revolution of the cam W, the recoil of the spiral spring $w$ retracts the sliding head, as stated, and the cutting-off bit, in its backward movement, causes the lifting up of the clearing-bit $y$ upon the surface of the horizontal bearing $t$ and the expansion of its spiral spring $z$ into the position of parts shown in Fig. 4.

The above, which is the last action upon the plug, is an action taking place, by the turning of the cams, subsequent to the action of the threading-bit and prior to the advance of the blank for forming a new plug, of which advance hereafter, and is the third of the three successive shaping actions which form the completed plug.

The advance of the blank to an extent sufficient to present material for the formation of a new plug is brought about by the action of a ratchet feed-bar, $b^x$, well shown in Figs. 1 and 2. This ratchet feed-bar $b^x$ is a bar of the diameter of the blank, and of diameter sufficient to enter within the hollow center of the driving-shaft. It passes through an upright bearing, $c^x$, upon the left hand of the shears, and is operated to advance a distance equal to the width of one notch or ratchet by a lever, $d^x$, pivoted from the frame, and bearing against a cam, $e^x$, upon the left-hand extremity of the cam-shaft.

$f^x$ is a pawl pivoted to the upper extremity of the lever $d^x$, which is bifurcated to embrace the ratchet-bar $b^x$. This pawl is held against the notches by a spring, $g^x$.

$h^x$ is a spring supported at the pivot of the lever $d^x$, and acting against the lower extremity of said lever, where it bears against its cam $e^x$ in such manner as to keep the upper extremity of the lever thrown to the left, except at the time when the cam is acting upon it to throw it to the right, and to cause the pawl to advance the ratchet-bar $b^x$ one notch to the right. The lever-spring $h^x$ is sufficiently strong to overpower the spring $g^x$ of the pawl $f^x$, and thereby allow the pawl to lift back over one notch after every full revolution of the cam $e^x$.

$i^x$ is a detent controlled by a spring, $j^x$, both of which are connected to the bearing $c^x$. The office of the detent is to keep the rotating blank in its advanced position without possibility of its slipping backward during the release of the clutch.

Such being the construction of my machine, it is obvious, in operating it, that after the shaping of each plug and prior to the advancing action of the ratchet-bar, the operative should seize the clutch-handle and deflect it out, so as to release the clutch and permit the advance of the blank. Should he fail, however, to do so, the action of the ratchet-bar is sufficiently powerful to cause the fresh end of the blank to spread the jaws of the clutch, deflect the sliding collar, and expand the spring $l$ of the clutch-handle, which spring alone holds the collar against the jaws of the clutch. After each blank has been completely formed into nozzles, the pawl $f^x$ and the detent $i^x$ are raised by the operative, or else the ratchet-bar is rotated so that its notches face downward, whereupon the bar is drawn out of the machine, a new blank is passed into the driving-shaft, and the ratchet-bar replaced in the position in which the pawl acts upon it.

It is obvious that the machine is under the full control of the operator through the worm-wheel lever V, by the action of which he can instantly connect or disconnect the cam-shaft and cause the operation or the stoppage of all the bits and of the ratchet-bar.

It is obvious, also, that the clutch-handle may be provided with a suitable stop or detent to keep it out of action when desired, in which case, although the belts may be on, the only portions of the machine in operation are the driving and driven shafts and the worm-wheel shaft, so that in order to insert a fresh blank it is not necessary to stop the machine, but simply to throw the cam-shaft out of action, whereupon it is possible to insert a new blank and place it in position to be acted upon, the clutch being thrown into gear before the cam-shaft is again thrown into action.

It will be observed that it is the action of the cam-shaft which, in turn, brings into action the shaping-bit, the threading-bit, the head-clearing and cutting-off bits, and the blank-feeding ratchet-bar, the action of all of which parts is, by the shaping of the cams, and by their placing and timing upon their shaft, made properly successive, although continuous, first the shaping-bit acting, then the threading-bit, then the clearing-bit, then the cutting-off bit, and finally the feed-bar, whereby the blank is advanced a sufficient extent, each notch or ratchet being apart from the next notch or ratchet a distance equal to the total depth of the completed plug.

It will also be readily seen that the machine is automatic without the aid of manual labor, the operative having only to supply fresh blanks to the machine, and to throw the cam-shaft into and out of action for such purpose.

Other material than metal can be employed for the blanks—as, for instance, wood, vulcanite, or the like.

If desired, each bit and the feed-bar may be provided with handles, whereby they can be separately operated by hand when disconnected from the cam-shaft.

Having thus described my invention, I claim and desire to secure by Letters Patent of the United States—

1. In an organized machine for making stoppers for the nozzles or bungs of cans, the following instrumentalities in combination, viz: a shaping-bit which reams out a blank of suitable material and shapes its exterior to the form of a stopper, a threading-bit which threads the exterior projection of the formed stopper, a clearing-bit which trues off the inner under surface of the head of the formed stopper, a cutting-off bit which cuts off the formed stopper from the blank, a feed which automatically advances the blank for the forming of a new stopper after the cutting off of the finished stopper, and mechanism which causes the successive operation of the above-mentioned devices.

2. In an organized machine for making stoppers from a suitable blank, the shaping-bit $a$, constructed as described, and adapted to ream out the blank and shape its exterior to the form of a stopper, in combination with mechanism for causing its automatic operation.

3. In a machine of the class hereinbefore recited, as a device for first clearing off the inner under face of the head of the plug, and, second, cutting off the formed plug, the clearing-bit $y$ and cutting-off bit $a^x$, operated as described, and mechanism for bringing said bits into action, substantially as hereinbefore set forth.

4. As a device for throwing the clearing-bit out of action prior to the action of the cutting-off bit, the bearing $t$ and spiral $z$.

In testimony whereof I have hereunto signed my name this 22d day of June, 1880.

WM. WILSON, Jr.

In presence of—
EDGAR A. FINLEY,
WILLIAM R. GREEN.